United States Patent
Li et al.

(10) Patent No.: US 8,498,135 B2
(45) Date of Patent: Jul. 30, 2013

(54) SWITCHING MODE POWER SUPPLY WITH SPECTRUM SHAPING AND THE METHOD THEREOF

(75) Inventors: En Li, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 442 days.

(21) Appl. No.: 12/944,568

(22) Filed: Nov. 11, 2010

(65) Prior Publication Data

US 2011/0110123 A1    May 12, 2011

(30) Foreign Application Priority Data

Nov. 11, 2009 (CN) .......................... 2009 1 0309569

(51) Int. Cl.
*H02M 3/335* (2006.01)
(52) U.S. Cl.
USPC .... 363/97; 363/21.05; 363/21.07; 363/21.09; 363/21.13; 363/21.15; 363/21.17
(58) Field of Classification Search
USPC .......... 363/21.01, 21.05, 21.07, 21.09, 21.13, 363/21.15, 21.17, 97
See application file for complete search history.

(56) References Cited

U.S. PATENT DOCUMENTS

| 6,385,060 B1* | 5/2002 | Basso et al. ................ 363/21.15 |
| 6,687,137 B1* | 2/2004 | Yasumura .................. 363/21.01 |
| 2010/0302816 A1* | 12/2010 | Hu et al. .................... 363/21.12 |
| 2011/0110123 A1* | 5/2011 | Li et al. ..................... 363/21.17 |
| 2011/0228570 A1* | 9/2011 | Li et al. ..................... 363/21.13 |

\* cited by examiner

*Primary Examiner* — Jeffrey Sterrett
(74) *Attorney, Agent, or Firm* — Perkins Coie LLP

(57) ABSTRACT

Embodiments of circuits and methods for a switching mode power supply are described in detail herein. In one embodiment, a switching mode power supply includes a transformer having a primary winding and a secondary winding to supply power to a load, a feedback circuit that generates a feedback signal that varies in relation to the load on the secondary winding, a switching circuit coupled to the primary winding to control current flow through the primary winding, and a control circuit coupled to the switching circuit to control the on/off status of switching circuit in response to the feedback signal and the current flow through the primary winding. The control circuit comprises a spectrum shaping circuit configured to generate a spectrum shaping signal in response to the feedback signal. The spectrum shaping signal can then be used to regulate the switching frequency and the spectrum shaping range.

16 Claims, 8 Drawing Sheets

SWITCHING MODE POWER SUPPLY WITH SPECTRUM SHAPING AND THE METHOD THEREOF

CROSS-REFERENCE TO RELATED APPLICATION(S)

The present application claims priority to Chinese Patent Application No. 200910309569.5, filed Nov. 11, 2009, the disclosure of which is incorporated herein by reference in its entirety.

TECHNICAL FIELD

The technology described in this patent document relates generally to switching mode power supplies.

BACKGROUND

Switching mode power supplies are used in various applications. In order to get small volume and high efficiency, switching frequencies of switching mode power supplies are rather high, e.g., tens of thousands hertz. However, such high switching frequencies may cause severe electro-magnetic interference ("EMI"), which may decrease electrical quality, interfering electronic components around switching mode power supplies, interferes to radio wave, and/or may cause other negative impacts. As a result, strict EMI standards have been adopted in many countries.

In order to reduce EMI, one prior art technique involves distributing energy in a small switching frequency range to a large switching frequency range by varying or modulating the switching frequency within first and second frequency bands, or in other words, within a spectrum shaping range. However, the spectrum is fixed, which is not suitable for switching mode power supplies with variable switching frequencies. So there is a need to provide an improved switching mode power supply that can regulate a spectrum shaping range according to a switching frequency.

DETAILED DESCRIPTION

Embodiments of circuits and methods for a switching mode power supply are described in detail herein. Many specific details that relate to certain embodiments are set forth in the following text to provide a thorough understanding of these embodiments. Several other embodiments can have configurations, components, and/or processes that are different from those described below. A person skilled in the relevant art, therefore, will appreciate that additional embodiments may be practiced without several of the details of the embodiments shown in FIGS. 1-6.

In one embodiment, a switching mode power supply includes a transformer having a primary winding and a secondary winding to supply power to a load, a feedback circuit that generates a feedback signal that varies in relation to the load on the secondary winding, a switching circuit coupled to the primary winding to control current flow through the primary winding, and a control circuit coupled to the switching circuit to control the on/off status of the switching circuit in response to the feedback signal and the current flow through the primary winding. The control circuit comprises a spectrum shaping circuit configured to generate a spectrum shaping signal in response to the feedback signal. The spectrum shaping signal can then be used to regulate the switching frequency and the spectrum shaping range.

In another embodiment, a method of controlling a switching mode power supply includes coupling a switching circuit to a primary winding of a transformer. The transformer is configured to store energy when the switching circuit is turned on, and to release energy to a secondary winding of the transformer when the switching circuit is turned off. The method also includes sensing a current flow through the primary winding of the transformer and generating a current sensing signal representing the sensed current. The method further includes sensing an output voltage of the transformer and generating a feedback signal related to the output voltage. The method yet further includes controlling on/off of the switching circuit in response to the current sensing signal and the feedback signal and regulating the switching frequency and spectrum shaping range of the switching mode power supply in response to the feedback signal.

Figure 1:
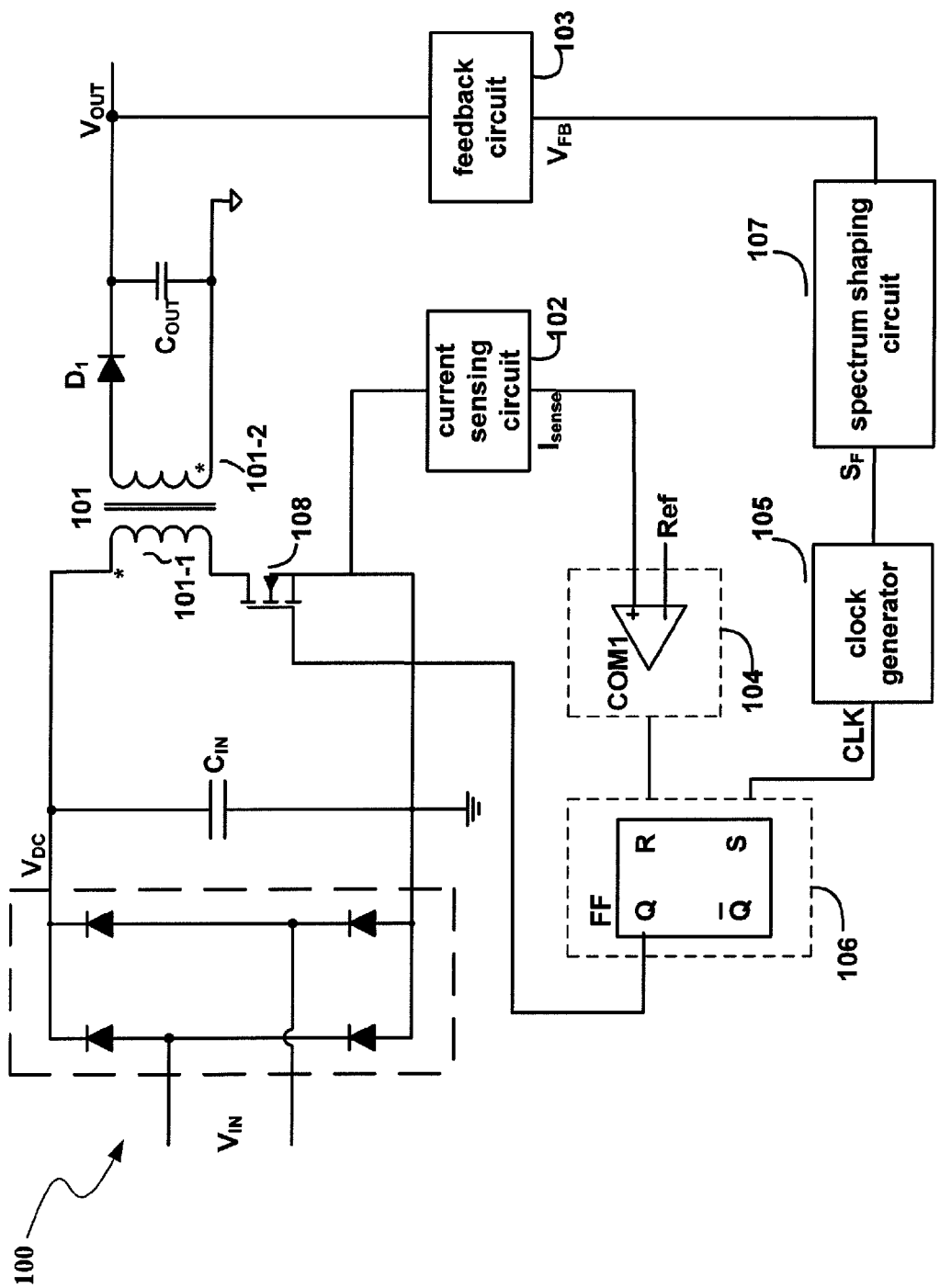
FIG. 1 is a schematic circuit diagram of a switching mode power supply in accordance with embodiments of the present technology.

FIG. 1 is a schematic circuit diagram of a switching mode power supply 100 in accordance with embodiments of the present technology. In certain embodiments, the switching mode power supply 100 includes a flyback converter. As shown in FIG. 1, the switching mode power supply 100 includes a rectifier bridge, a transformer 101, a current sensing circuit 102, a feedback circuit 103, a comparison circuit 104, a clock generator 105, a logical circuit 106, a spectrum shaping circuit 107, and a switching circuit 108. In other embodiments, the switching mode power supply 100 can have other suitable configurations with additional and/or different components.

The transformer 101, in one embodiment, includes a primary winding 101-1 and a secondary winding 101-2. The switching circuit 108, in one embodiment, may be any controllable semiconductor switch device, such as MOSFET, IGBT, BJT, etc. In one embodiment, the switching mode power supply 100 further includes an input capacitor ($C_{IN}$) coupled across the rectifier bridge, a diode ($D_1$) coupled in series with the secondary winding 101-2 of the transformer 101, and an output capacitor ($C_{OUT}$) coupled between the output port of the switching mode power supply 100 and ground.

In operation, the rectifier bridge receives an AC input signal ($V_{IN}$), and converts the received AC input signal ($V_{IN}$) into a DC signal to be received by the primary winding 101-1 of the transformer 101. The transformer 101 is controlled to generate a DC output voltage ($V_{OUT}$) on the secondary winding 101-2 of the transformer 101 by controlling the on/off of the switching circuit 108.

In one embodiment, the current sensing circuit 102 is coupled to the switching circuit 108, for sensing the current flow through the switching circuit 108, and generating a current sensing signal $I_{sense}$ based thereupon. In certain embodiments, the current sensing circuit 102 may comprise a resistor, a transformer, a current amplifier, and/or other suitable components.

In one embodiment, the feedback circuit 103 is coupled to the output port of the switching mode power supply 100, for generating a feedback signal ($V_{FB}$) which is related to the output voltage ($V_{OUT}$). In one embodiment, the feedback circuit 103 includes an opto-coupler or a transformer. In another embodiment, the feedback circuit 103 includes a resistor-divided circuit or a capacitor-divided circuit. In further embodiments, the feedback circuit 103 can include other suitable components.

In one embodiment, the comparison circuit 104 receives the current sensing signal ($I_{sense}$) at one input terminal, and receives a reference signal ($R_{ef}$) at the other input terminal. The comparison circuit 104 compares the current sensing signal ($I_{sense}$) with the reference signal ($R_{ef}$), and provides a comparison signal based thereupon. The comparison circuit 104 can include an op-amp, a transformer, and/or other suitable components.

As shown in FIG. 1, the spectrum shaping circuit 107 is coupled to the output of the feedback circuit 103, for receiving the feedback signal ($V_{FB}$) and providing a spectrum shaping signal ($S_F$). The clock generating circuit 105 is coupled to the output of the spectrum shaping circuit 107, for receiving the spectrum shaping signal ($S_F$) and providing a clock signal (CLK) based thereupon. One input terminal of the logical circuit 106 is coupled to the output of the comparison circuit 104, for receiving the comparison signal; the other input terminal of the logical circuit 106 is coupled to the output of the clock generating circuit 105, for receiving the clock signal (CLK). The logical circuit 106 provides a control signal which is used to control the on/off of the switching circuit 108 in response to the comparison signal and the clock signal. In one embodiment, the switching circuit 108 is turned on when a rising edge of the clock signal (CLK) arrives, and is turned off when the current sense signal is higher than the reference signal ($R_{ef}$). However, in other embodiments, the switching circuit 108 may be turned on/off under other suitable conditions.

As illustrated hereinbefore, the current sensing circuit 102, the comparison circuit 104, the clock generator 105, the logical circuit 106, and the spectrum shaping circuit 107 forms a control circuit that controls the on/off of the switching circuit 108, thereby controlling the energy delivered to the secondary winding 101-2 of the transformer 101. Optionally, in certain embodiments, a driven circuit 109 is coupled between the logical circuit 106 and the switching circuit 108 for improving driven ability, as illustrated in the switching mode power supply 100' of FIG. 2.

Figure 2:
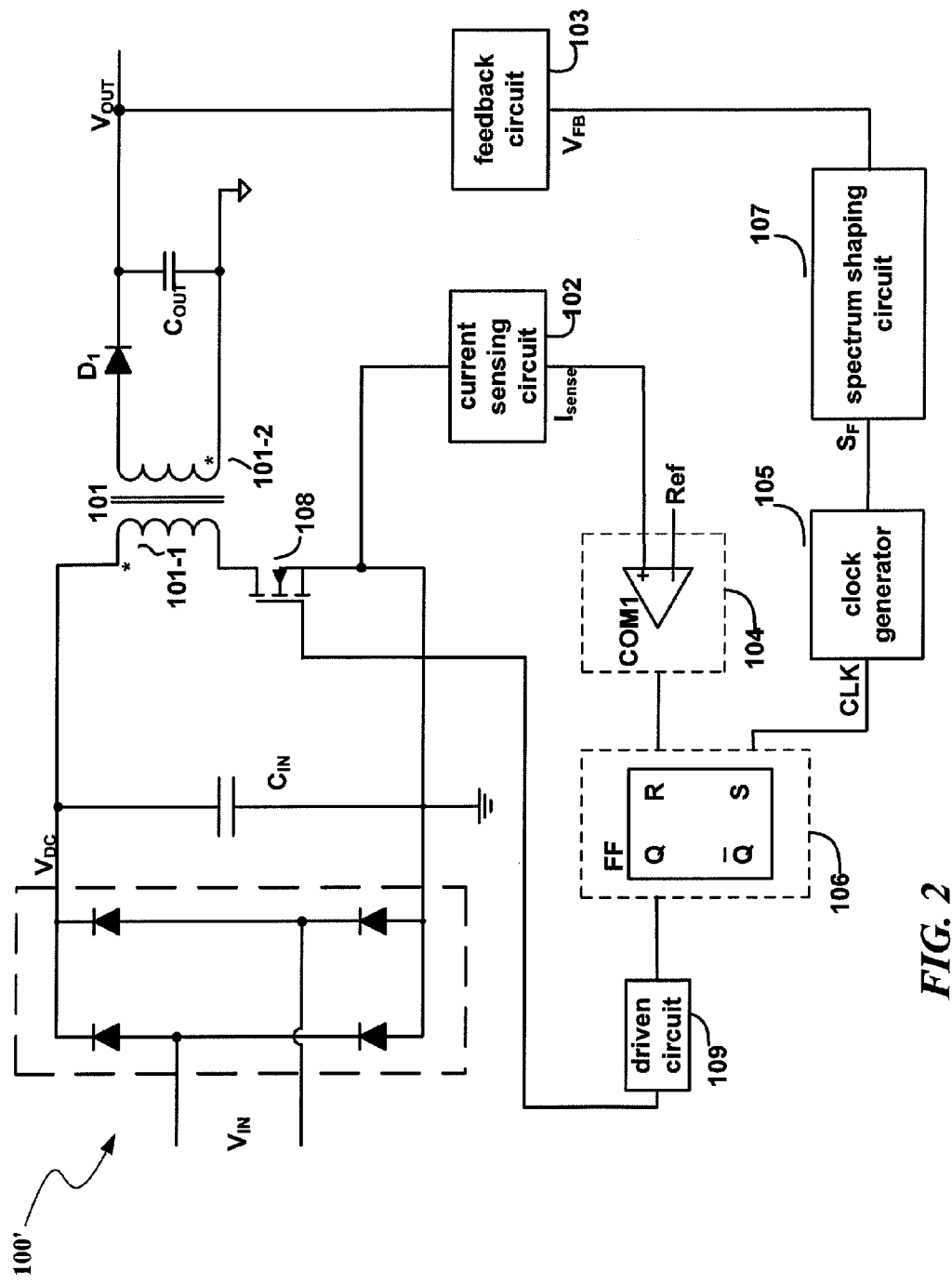
FIG. 2 is a schematic circuit diagram of a switching mode power supply in accordance with additional embodiments of the present technology.

Referring to FIGS. 1 and 2 together, in the illustrated embodiment, the switching circuit 108 comprises an n-channel MOSFET; the comparison circuit 104 comprises a comparator (COM1); and the logical circuit 106 comprises a flip-flop (FF). The non-inventing input terminal of the comparator (COM1) is coupled to receive the current sensing signal ($I_{sense}$), and the inverting input terminal of the comparator (COM1) is coupled to receive the reference signal ($R_{ef}$).

The flip-flop (FF) comprises a set terminal (S) and a reset terminal (R). The reset terminal (R) of the flip-flop (FF) is coupled to the output terminal of the comparator (COM1) for receiving the comparison signal, while the set terminal (S) of the flip-flop (FF) is coupled to the clock generator 105 for receiving the clock signal (CLK). The feedback circuit 103 is coupled to the output port of the switching mode power supply 100 for generating the feedback signal ($V_{FB}$) related to the output voltage ($V_{OUT}$).

The input terminal of the spectrum shaping circuit 107 is coupled to the output of the feedback circuit 103 for receiving the feedback signal ($V_{FB}$), and providing the spectrum shaping signal ($S_F$) to the clock generator 105, so that the clock generator 105 regulates the switching frequency and the spectrum shaping range accordingly. In one embodiment, the higher the frequency, the broader the spectrum shaping range.

Figure 3A:
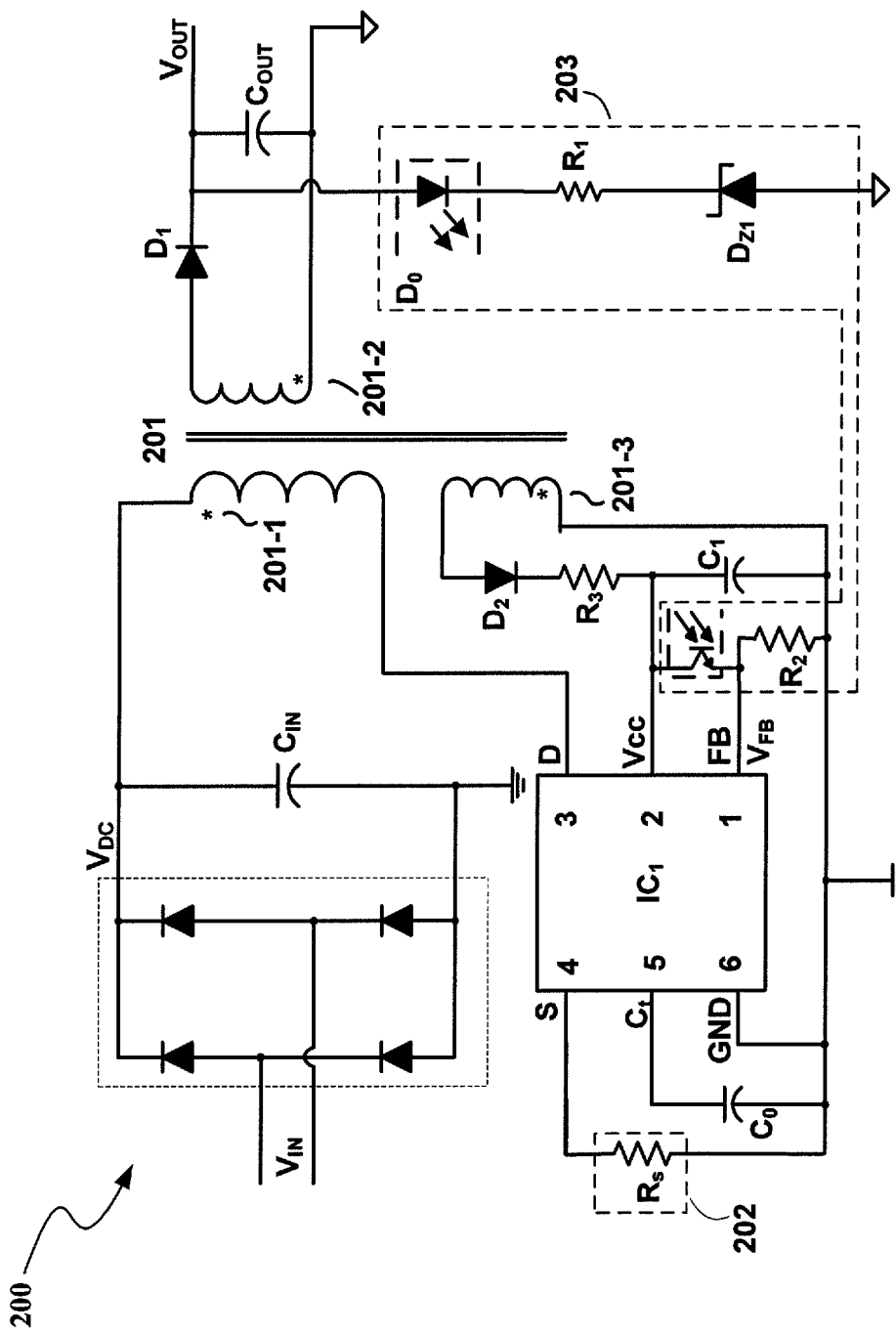
FIG. 3A is a schematic circuit diagram of a switching mode power supply in accordance with further embodiments of the present technology.
Figure 3B:
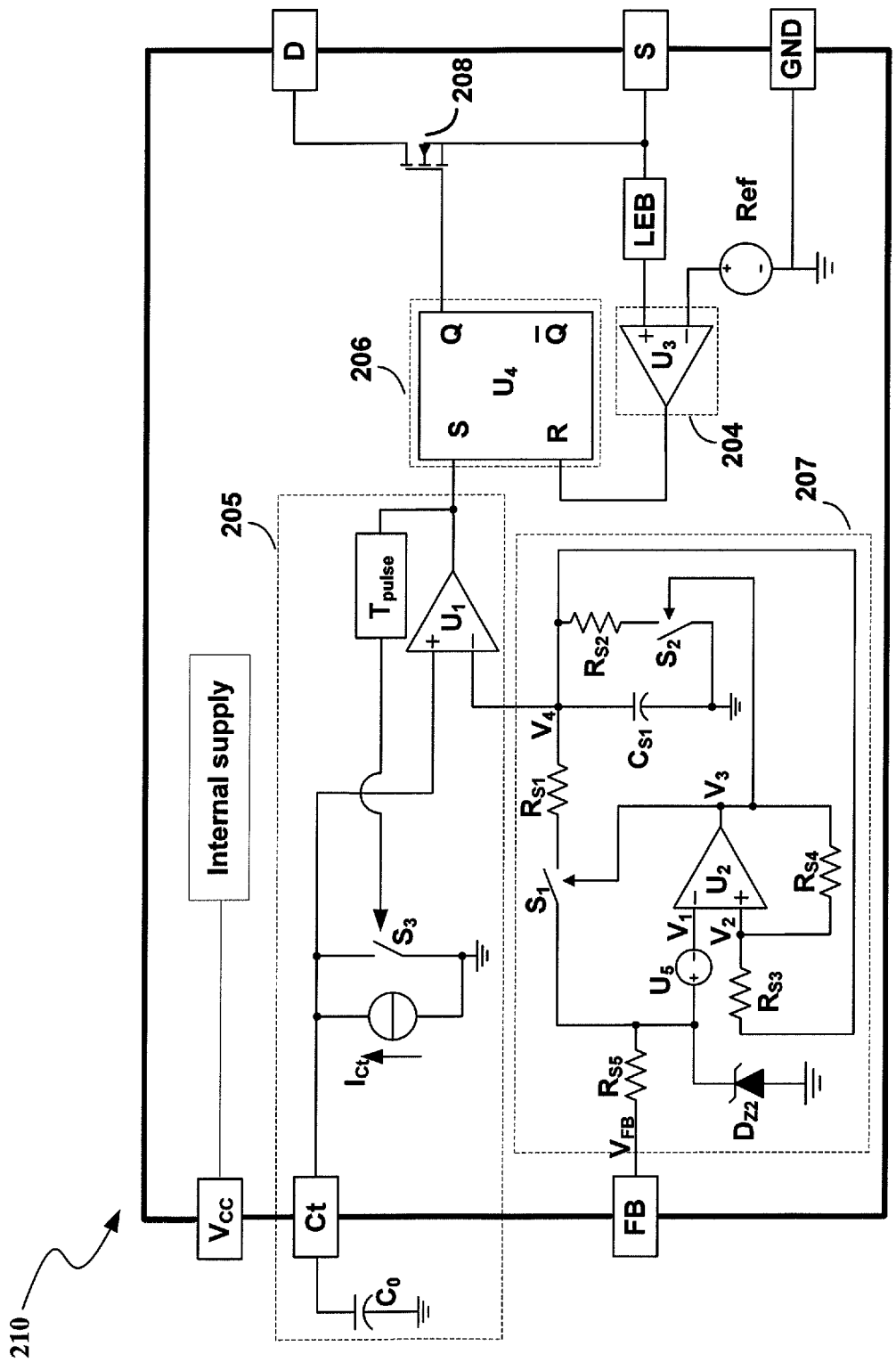
FIG. 3B is a block diagram of a control chip ($I_{C1}$) useful in the switching mode power supply of FIG. 3A in accordance with embodiments of the present technology.

FIG. 3A is a schematic circuit diagram of a switching mode power supply 200 in accordance with additional embodiments of the present technology, and FIG. 3B shows a detailed block diagram of the control chip ($I_{C1}$) in FIG. 3A. The switching mode power supply 200 comprises a rectifier bridge, a transformer 201, a current sensing circuit 202, a feedback circuit 203, a comparison circuit 204, a clock generator 205, a logical circuit 206, a spectrum shaping circuit 207, and a switching circuit 208. In one embodiment, the switching circuit 208 is a switching device integrated in the control chip ($IC_1$). In other embodiments, the switching circuit 208 may include other suitable configurations.

In one embodiment, the transformer 201 includes a primary winding 201-1, a secondary winding 201-2, and an auxiliary winding 201-3. The feedback circuit 203 includes an opto-coupler ($D_0$), a first resistor ($R_1$), a first Zener diode ($D_{Z1}$) and a second resistor ($R_2$). The opto-coupler ($D_0$) comprises a photodiode and a phototransistor. The photodiode, the first resistor ($R_1$) and the first Zener diode ($D_{Z1}$) are coupled in series between the output port of the switching mode power supply 200 and secondary side ground. The phototransistor and the second resistor ($R_2$) are coupled in series between a power supply and primary side ground.

In one embodiment, the voltage across the second resistor ($R_2$) represents the feedback voltage ($V_{FB}$) that is inversely proportional to the output voltage ($V_{OUT}$) on the main secondary winding 201-2 of the transformer 201. As described in more detail below, the feedback signal ($V_{FB}$) is used by the control circuit to control the switching frequency and the spectrum shaping range of the switching mode power supply 200 as a function of the output voltage ($V_{OUT}$).

In operation, the intensity of light emitted by the photodiode is inversely proportional to the output voltage ($V_{OUT}$). As the intensity of the photodiode increases, so does the current flow through the phototransistor, which generates the feedback signal ($V_{FB}$) across the second feedback resistor ($R_2$). Therefore, the feedback signal ($V_{FB}$) is inversely proportional to the output voltage ($V_{OUT}$), i.e., the feedback signal ($V_{FB}$) increases as the output voltage ($V_{OUT}$) becomes lower and decreases as the output voltage ($V_{OUT}$) becomes higher. It should be understood, however, that in other embodiments, the feedback circuit 203 and control circuit may be configured such that the feedback signal ($V_{FB}$) is proportional to or otherwise varies in relation to the output voltage ($V_{OUT}$).

As shown in FIG. 3A, in one embodiment, the control circuit includes the control chip ($I_{C1}$), the resistor ($R_S$), and a capacitor ($C_0$). The switching mode power supply 200 further comprises the auxiliary winding 201-3, a diode ($D_2$), a third resistor ($R_3$), and a capacitor ($C_1$), which are configured to provide power supply to the control chip ($I_{C1}$).

In one embodiment, the logical circuit 206 includes a flip-flop ($U_4$). The clock generator 205 includes a saw-tooth wave generator and a short pulse circuit ($T_{pulse}$). In one embodiment, the saw-tooth wave generator comprises a capacitor ($C_0$) which is placed at the outside of the control chip ($I_{C1}$), a current source ($I_{Ct}$), a switch ($S_3$), and a first comparator ($U_1$). The capacitor ($C_0$), the current source ($I_{Ct}$), and the switch ($S_3$) are coupled in parallel between the non-inverting input terminal of the first comparator ($U_1$) and primary side ground, respectively. The short pulse circuit ($T_{pulse}$) is coupled between the output of the first comparator ($U_1$) and the control terminal of the switch ($S_3$). When the output of the first comparator ($U_1$) is high, the switch ($S_3$) is turned on for a short time period ($T_p$).

Figure 3C:
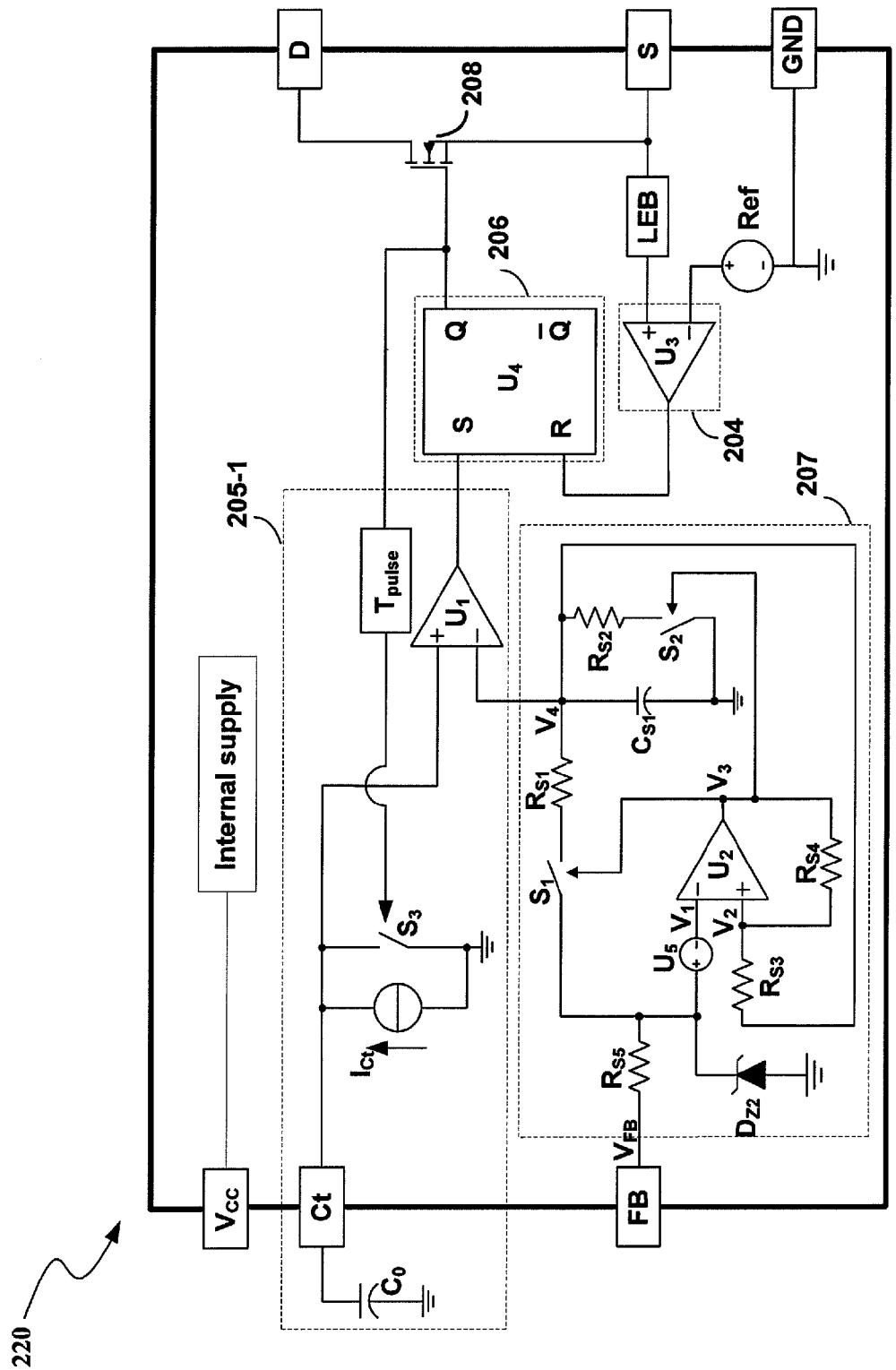
FIG. 3C is a schematic circuit diagram of a control chip $IC_1$ useful in the switching mode power supply of FIG. 3A in accordance with embodiments of the present technology.

It should be understood, however, that in other embodiments the short pulse circuit ($T_{pulse}$) may be coupled between the output of the logical circuit 206 and the control terminal of the switch ($S_3$), as shown in FIG. 3C. When the output of the first comparator ($U_1$) turns high, the output of the logical circuit 206 turns high in response. Accordingly, the switch ($S_3$) is turned on for a short time period ($T_P$) via the short pulse circuit ($T_{pulse}$). As a result, the voltage across the capacitor ($C_0$) is reset, and the output of the first comparator ($U_1$) turns low.

After the short time period ($T_P$), the switch ($S_3$) is turned off, and the capacitor ($C_0$) is re-charged until the voltage across it becomes higher than the voltage at the inverting input terminal of the first comparator ($U_1$). Then the output of the first comparator ($U_1$) is high again, the switching mode power supply enters a new cycle. The operation of the switching mode power supply 200 is generally similar to those discussed above with reference to FIGS. 1 and 2.

Figure 3D:
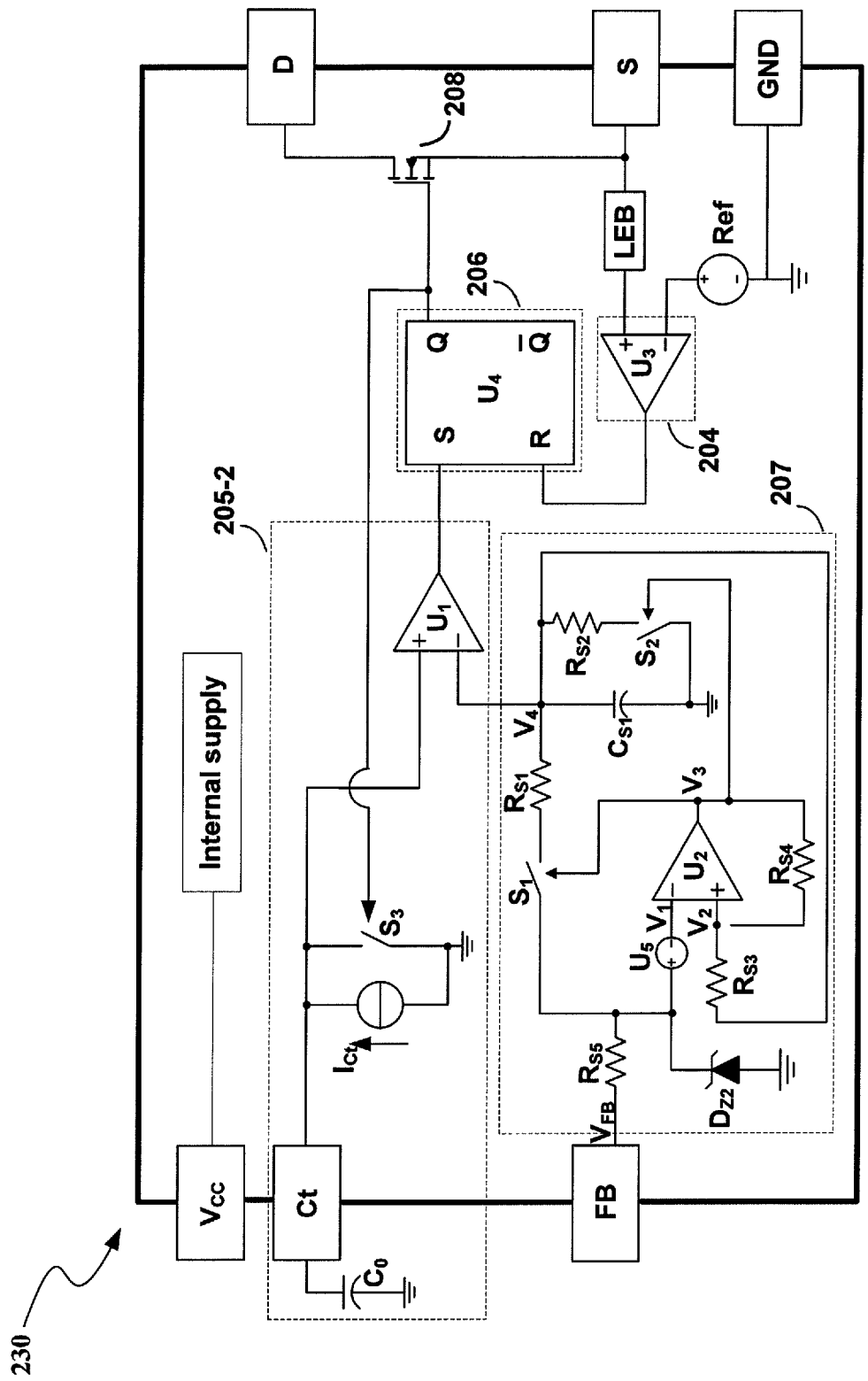
FIG. 3D is a schematic circuit diagram of a control chip $IC_1$ useful in the switching mode power supply of FIG. 3A in accordance with further embodiments of the present technology.

It should be understood, however, that in other embodiments, the short pulse circuit may be omitted, as shown in FIG. 3D. Thus, the clock generator 205-2 only includes a saw-tooth wave generator. The output of the logical circuit 206 is coupled to the control terminal of the switch ($S_3$) directly. When the output of the first comparator ($U_1$) turns high, the output of the logical circuit 206 turns high, which turns on the switch ($S_3$) accordingly. The switch ($S_3$) maintains on until the logical circuit 206 outputs a low-level signal.

In the embodiments that illustrated above, the capacitor ($C_0$) is placed at the outside of the control chip ($I_{C1}$). It should be understood, however, that in other embodiments the capacitor may be integrated into the control chip ($I_{C1}$). The remaining parts of the circuit in FIG. 3C and FIG. 3D are generally similar to those in FIG. 3B. So the following detailed description based on the circuit in FIG. 3B also applied to the circuit in FIG. 3C and FIG. 3D.

In one embodiment, the current sensing circuit 202 comprises a current sense resistor ($R_S$) which is coupled between one terminal of the switching circuit 208 and ground, for sensing the current flow through the switching circuit 208. It should be understood, however, that in other embodiments the current sensing circuit may comprise a transformer sensing circuit or may use the switching circuit's on resistor to sense its own current.

In one embodiment, the comparison circuit 204 comprises a third comparator ($U_3$). The non-inverting input terminal of the third comparator ($U_3$) is coupled to the common node of the current sense resistor ($R_S$) and the switching circuit 208, for receiving the sensed current. The inverting input terminal of the third comparator ($U_3$) receives a reference signal ($R_{ef}$). The output of the third comparator ($U_3$) is coupled to the reset terminal (R) of the flip-flop ($U_4$). In order to eliminate the error caused by the reverse recovery of the body diode and the parasitic oscillation, a leading edge blanking circuit (LEB) may be coupled between the non-inverting input terminal of the third comparator ($U_3$) and the common node of the current sense resistor ($R_S$) and the switching circuit 208.

In one embodiment, the spectrum shaping circuit 207 comprises a second comparator ($U_2$), a first switch ($S_1$), a second switch ($S_2$), a bias circuit ($U_5$), a first shaping resistor ($R_{S1}$), a second shaping resistor ($R_{S2}$), a third shaping resistor ($R_{S3}$), a fourth shaping resistor ($R_{S4}$), a fifth resistor ($R_{S5}$, a shaping capacitor ($C_{S1}$) and a second Zener diode ($D_{Z2}$). The feedback signal ($V_{FB}$) is sent to the spectrum shaping circuit 207 via a feedback pin (FB). That is, the input terminal of the spectrum shaping is coupled to the output terminal of the feedback circuit 203, for receiving the feedback signal ($V_{FB}$).

In one embodiment, the bias circuit ($U_5$) has a bias voltage with a voltage value of $V_{bias}$, and the second Zener diode ($D_{Z2}$) has a clamp voltage of $V_{Zener}$. The shaping capacitor ($C_{S1}$) is coupled between the output of the spectrum shaping circuit 207 and primary side ground. The second shaping resistor ($R_{S2}$) and the second switch ($S_2$) are coupled in series between the output of the spectrum shaping circuit 207 and primary side ground. The first terminal of the fifth resistor ($R_{S5}$) is coupled to the feedback pin (FB), the second terminal of the fifth resistor ($R_{S5}$) is coupled to the inverting input terminal of the second comparator ($U_2$) via the bias circuit ($U_5$) and coupled to the output of the spectrum shaping circuit 207 via the first switch ($S_1$). The second terminal of the fifth resistor ($R_{S5}$) is further coupled to the cathode of the second Zener diode ($D_{Z2}$) whose anode is connected to primary side ground. When the feedback signal ($V_{FB}$) is higher than the clamp voltage ($V_{Zener}$), the feedback signal ($V_{FB}$) is clamped to $V_{Zener}$.

In one embodiment, the first switch ($S_1$) and the second switch ($S_2$) are turned on and off alternately. The first switch ($S_1$) and the second switch ($S_2$) are controlled by the output signal ($V_3$) of the second comparator ($U_2$). In one embodiment, when the output signal ($V_3$) of the second comparator ($U_2$) is low, the first switch ($S_1$) is turned on, and the second switch ($S_2$) is turned off, so the shaping capacitor ($C_{S1}$) is charged. When the output signal ($V_3$) is high, the first switch ($S_1$) is turned off, and the second switch ($S_2$) is turned on, the shaping capacitor ($C_{S1}$) is discharged.

In one embodiment, the non-inverting input terminal of the second comparator ($U_2$) is coupled to the output of the spectrum shaping circuit 207 via the third shaping resistor ($R_{S3}$). The fourth shaping resistor ($R_{S4}$) is coupled between the non-inverting input terminal and the output terminal of the second comparator ($U_2$). In one embodiment, the output of the spectrum shaping circuit 207 is further coupled to the clock generator 205.

During operation, when the clock generator 205 provides a high-level signal to the set terminal of the flip-flop ($U_4$), the output of the flip-flop ($U_4$) goes high. Accordingly, the switching circuit 208 is turned on, the current flow through the primary winding 201-1 of the transformer 201 increases, so does the current sensing signal ($I_{sense}$). When the current sensing signal ($I_{sense}$) increases to be higher than the reference signal ($R_{ef}$), the comparison signal goes high. As a result, the output of the flip-flop ($U_4$) is reset to zero, and the switching circuit 208 is turned off. When the clock generator 205 provides another high-level signal, the flip-flop ($U_4$) is set again; and the switching mode power supply 200 enters another switching cycle, and operates as illustrated hereinbefore.

Every time the voltage across the capacitor ($C_0$) reaches the voltage at the inverting input terminal of the first comparator ($U_1$), the switching mode power supply 200 enters a new switching cycle. So the frequency of the switching mode power supply, i.e., the frequency of the clock generator 205 is $$f = \frac{1}{C_{C0} \times \frac{V_4}{I_0} + T_P},$$

wherein $C_{C0}$ is the capacitance of the capacitor ($C_0$), $I_0$ is the current provided by the current source ($I_{Ct}$), $T_P$ is the time period of the short pulse, and $V_4$ is the output voltage of the spectrum shaping signal. For a given switching mode power supply, parameters of $C_{C0}$, $I_0$, and $T_P$ are set, so the frequency of the clock generator 205, i.e., the switching frequency is determined by the spectrum shaping signal. The higher $V_4$ is, the lower the switching frequency. The lower $V_4$ is, the higher the switching frequency.

Similarly, the frequency of the clock generator 205-2 is $$f = \frac{1}{C_{C0} \times \frac{V_4}{I_0} + T_{ON}},$$

wherein $C_{C0}$ is the capacitance of the capacitor ($C_0$), $I_0$ is the current provided by the current source ($I_{Ct}$), $V_4$ is the output voltage of the spectrum shaping signal, and $T_{ON}$ is the duration of the logical circuit 206's high-level output, i.e., the on time of the switching circuit 208 in one cycle. During $T_{ON}$, the current flow through the switching circuit 208 increases, thus $$T_{ON} = L \times \frac{\Delta I}{V_{DC}},$$

wherein L is the inductance of the magnetizing inductor of the primary winding 201-1 of the transformer 201, $\Delta I$ is the difference between the maximum current value and the minimum current value through the switching circuit 208 in one switching cycle, and $V_{DC}$ is the voltage of the input signal after rectification.

As illustrated hereinbefore, the output of the comparison circuit 204 turns high when the current flow through the switching circuit 208 is higher than the reference signal ($R_{ef}$). The switching circuit 208 is turned off accordingly. Thus $$\Delta I = \frac{V_{Ref}}{R_{RS}},$$

wherein $V_{Ref}$ is the voltage of the reference signal ($R_{ef}$), $R_{RS}$ is the resistance of the current sense resistor ($R_S$). So the frequency of the clock generator 205-2 is:

$$f = \frac{1}{C_{C0} \times \frac{V_4}{I_0} + L \times \frac{V_{Ref}}{R_{RS} \times V_{DC}}}.$$

For a given switching mode power supply, parameters of $C_{C0}$, $I_0$, L, $V_{Ref}$, $R_{RS}$, and $V_{DC}$ are set. As a result, the frequency of the clock generator 205-2, i.e., the switching frequency is determined by the spectrum shaping signal. The higher $V_4$ is, the lower the switching frequency. The lower $V_4$ is, the higher the switching frequency.

As described in more detail below, the spectrum shaping signal can be a triangular wave. In the spectrum shaping circuit 207, if the voltage ($V_1$) at the inverting input terminal of the second comparator ($U_2$) is higher than the voltage ($V_2$) at the non-inverting input terminal of the second comparator ($U_2$), i.e., $V_1 > V_2$, the output of the second comparator ($U_2$) turns low ($V_3 = 0$). Accordingly, the first switch ($S_1$) is turned on and the second switch ($S_2$) is turned off. The shaping capacitor ($C_{S1}$) is charged by the feedback signal ($V_{FB}$) via the fifth resistor ($R_{S5}$), the first switch ($S_1$) and the first shaping resistor ($R_{S1}$). As a result, the spectrum shaping signal increases slowly. The voltage ($V_2$) at the non-inverting input terminal of the second comparator ($U_2$) is $$V_2 = V_4 \times \frac{R_{S4}}{R_{S3} + R_{S4}}.$$

Thus, the voltage ($V_2$) at the non-inverting input terminal of the second comparator ($U_2$) increases as the spectrum shaping signal increases.

When it increases to be higher than the voltage ($V_1$) at the inverting input terminal of the second comparator ($U_2$), i.e., $V_2 > V_1$, the output of the second comparator ($U_2$) turns high ($V_3 = V_{3H}$). Accordingly, the first switch ($S_1$) is turned off, the second switch ($S_2$) is turned on. The shaping capacitor ($C_{S1}$) is discharged via the second shaping resistor ($R_2$) and the second switch ($S_2$). Then the voltage ($V_2$) at the non-inverting input terminal of the second comparator ($U_2$) is $$V_2 = V_4 \times \frac{R_{S4}}{R_{S3} + R_{S4}} + V_{3H} \times \frac{R_{S3}}{R_{S3} + R_{S4}}.$$

Thus, the voltage ($V_2$) at the non-inverting input terminal of the second comparator ($U_2$) decreases as the spectrum shaping signal decreases. When it decreases to be lower than the voltage ($V_1$) at the inverting input terminal of the second comparator ($U_2$), i.e., $V_2 < V_1$, the output of the second comparator ($U_2$) turns low again. Accordingly, the shaping capacitor ($C_{S1}$) is charged/discharged as illustrated hereinbefore. And the spectrum shaping signal is a triangular wave, as shown in FIG. 4.

Figure 4:
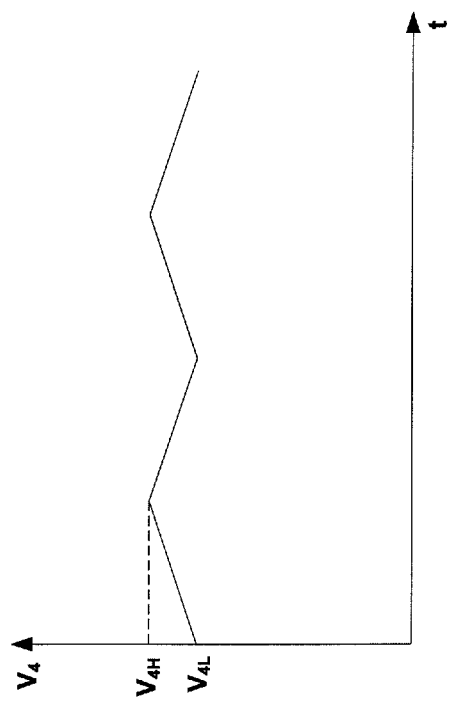
FIG. 4 illustrates a triangular waveform by a spectrum shaping circuit in the switching mode power supply of FIG. 3A in accordance with embodiments of the present technology.

As shown in FIG. 4, the triangular wave has a wave crest of $$V_{4H} = \frac{R_{S3} + R_{S4}}{R_{S4}} \times (V_{FB} - V_{bias}),$$

the corresponding frequency of the clock generator 205, i.e., the switching frequency of the switching mode power supply 200 is minimum:

$$f_L = \cfrac{1}{T_p + C_{C0} \times \cfrac{V_{4H}}{I_0}} = \cfrac{1}{T_p + C_{C0} \times \cfrac{\cfrac{R_{S3}+R_{S4}}{R_{S4}} \times (V_{FB}-V_{bias})}{I_0}} \quad (1)$$

In addition, the triangular wave has a wave trough of $$V_{4L} = \frac{R_{S3}+R_{S4}}{R_{S4}} \times \left(V_{FB} - V_{bias} - V_{3H} \times \frac{R_{S3}}{R_{S3}+R_{S4}}\right),$$

the corresponding frequency of the clock generator 205, i.e., the switching frequency of the switching mode power supply 200 is maximum:

$$f_H = \cfrac{1}{T_p + C_{C0} \times \cfrac{V_{4L}}{I_0}} \quad (2)$$

$$= \cfrac{1}{T_p + C_{C0} \times \cfrac{\cfrac{R_{S3}+R_{S4}}{R_{S4}} \times \left(V_{FB}-V_{bias}-V_{3H} \times \cfrac{R_{S3}}{R_{S3}+R_{S4}}\right)}{I_0}}$$

Figure 5:
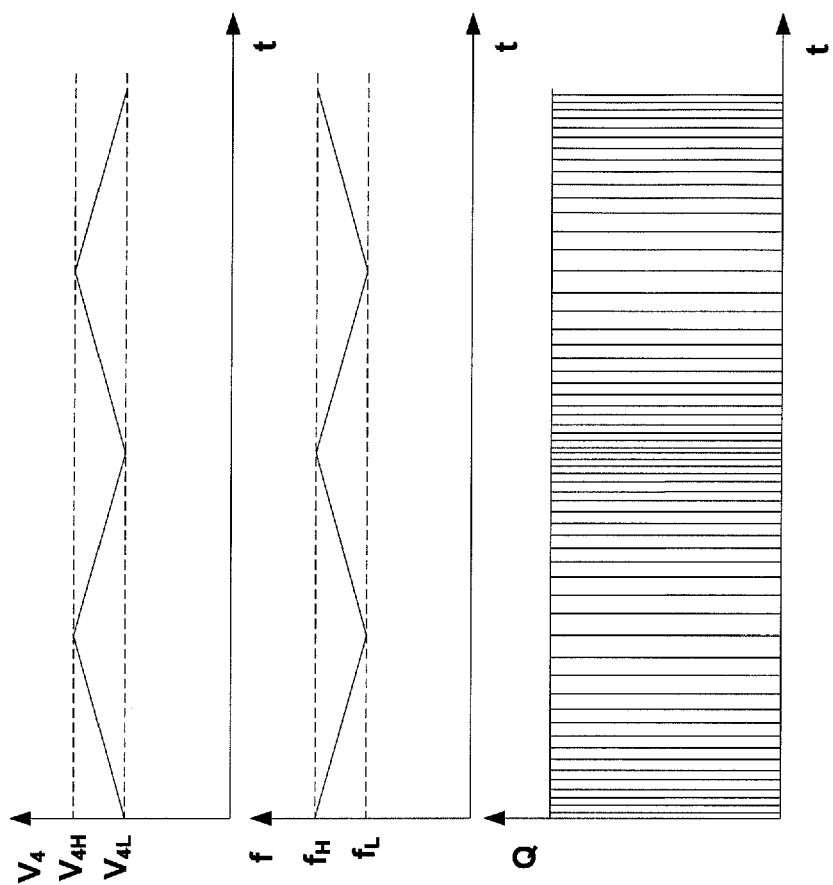
FIG. 5 illustrates waveforms of a control signal, output signals of a spectrum shaping circuit, and a clock generator in the switching mode power supply of FIG. 3A in accordance with yet further embodiments of the present technology.

The spectrum shaping signal ($V_4$), the switching frequency (f) and the control signal (Q) of the switching circuit 208 are shown in FIG. 5.

From equation (1) and equation (2) above, it can be seen that, the switching frequency decreases as the feedback signal ($V_{FB}$) increases; and the switching frequency increases as the feedback signal ($V_{FB}$) decreases. Subtract equation (1) from equation (2), the spectrum shaping range is:

$$\Delta f = \cfrac{1}{T_p + C_{C0} \times \cfrac{\cfrac{R_{S3}+R_{S4}}{R_{S4}} \times \left(V_{FB}-V_{bias}-V_{3H} \times \cfrac{R_{S3}}{R_{S3}+R_{S4}}\right)}{I_0}} - \cfrac{1}{T_p + C_{C0} \times \cfrac{\cfrac{R_{S3}+R_{S4}}{R_{S4}} \times (V_{FB}-V_{bias})}{I_0}} \quad (3)$$

i.e., $$\Delta f = \cfrac{C_{C0} \times \cfrac{\cfrac{R_{S3}}{R_{S4}} \times V_{3H}}{I_0}}{\left[T_p + C_{C0} \times \cfrac{\cfrac{R_{S3}+R_{S4}}{R_{S4}} \times \left(\begin{array}{c}V_{FB}-V_{bias}-\\ V_{3H} \times \cfrac{R_{S3}}{R_{S3}+R_{S4}}\end{array}\right)}{I_0}\right] \times \left[T_p \times C_{C0} \times \cfrac{\cfrac{R_{S3}+R_{S4}}{R_{S4}} \times (V_{FB}-V_{bias})}{I_0}\right]}$$

In one embodiment, because parameters of $C_{C0}$, $I_0$, $T_P$, $R_{S1}$, $R_{S2}$, $R_{S3}$, $R_{S4}$, $V_{bias}$, and $V_{3H}$ in equation (3) are set, the spectrum shaping range Δf of switching mode power supply is inversely proportional to the feedback signal ($V_{FB}$). In addition, as illustrated hereinbefore, the frequency of the switching mode power supply is inversely proportional to the feedback signal ($V_{FB}$). When the switching mode power supply is lower, and the spectrum shaping range Δf of switching mode power supply becomes narrower when the feedback signal ($V_{FB}$) increases; the switching mode power supply is higher, and the spectrum shaping range Δf of switching mode power supply becomes broader when the feedback signal ($V_{FB}$) decreases.

Figure 6:
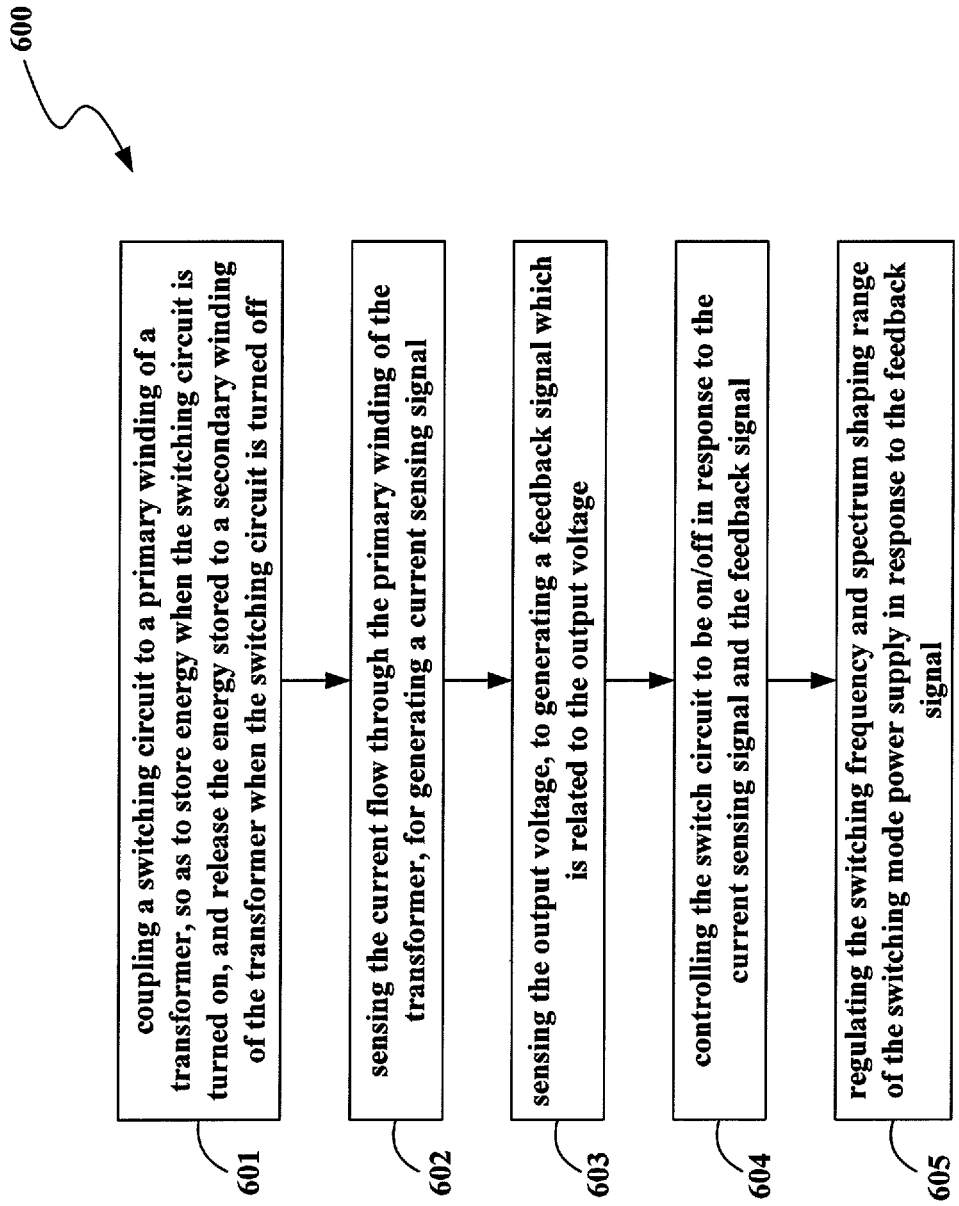
FIG. 6 is a flowchart in accordance with embodiments of the present technology.

FIG. 6 is a flowchart 600 in accordance with yet another embodiment of the present technology. In one embodiment, flowchart 600 comprises: Stage 601, coupling a switching circuit to a primary winding of a transformer, so as to store energy when the switching circuit is turned on, and release the energy stored to a secondary winding of the transformer when the switching circuit is turned off; Stage 602, sensing the current flow through the primary winding of the transformer, for generating a current sensing signal; Stage 603, sensing the output voltage, to generating a feedback signal which is related to the output voltage; Stage 604, controlling a switching circuit to be on/off in response to the current sensing signal and the feedback signal; and Stage 605, regulating the switching frequency and spectrum shaping range of the switching mode power supply in response to the feedback signal.

In one embodiment, stage 604 further comprises comparing the current sensing signal with a reference signal, and turning off the switching circuit when the current sensing signal is higher than the reference signal. In one embodiment, stage 605 further comprises: stage 605-1, generating a spectrum shaping signal in response to the feedback signal; stage 605-2, generating a clock signal in response to the spectrum shaping signal, so as to turn on the switch at the edge of the clock signal; and stage 605-3, regulating the switching frequency by regulating the frequency of the clock signal.

From the foregoing, it will be appreciated that specific embodiments of the technology have been described herein for purposes of illustration, but that various modifications may be made without deviating from the technology. Many of the elements of one embodiment may be combined with other embodiments in addition to or in lieu of the elements of the other embodiments. Accordingly, the technology is not limited except as by the appended claims.

We claim:

1. A switching mode power supply, comprising:
   a transformer having a primary winding and a secondary winding;
   a feedback circuit configured to generate a feedback signal that varies in relation to a load on the secondary winding;
   a switching circuit coupled to the primary winding, the switching circuit having a switch coupled to the primary winding and configured to control a current flow through the primary winding; and
   a control circuit coupled to the switching circuit, the control circuit being configured to output a switching frequency to toggle the switch of the switching circuit in response to the feedback signal and the current flow through the primary winding; wherein
   the control circuit comprises a spectrum shaping circuit configured to generate a spectrum shaping signal in response to the feedback signal, wherein the switching frequency is varied within a spectrum shaping range in accordance with the spectrum shaping signal.

2. The switching mode power supply of claim 1, wherein the spectrum shaping range is broader if the switching frequency is higher, and wherein the spectrum shaping range is narrower if the switching frequency is lower.

3. The switching mode power supply of claim 1, wherein the feedback circuit comprises an opto-coupler, a first resistor, a second resistor, and a Zener diode, and wherein the opto-coupler comprises:

a photodiode coupled in series with the first resistor and a first Zener diode between an output port of the switching mode power supply and secondary side ground; and a phototransistor coupled in series with the second resistor between the power supply and primary side ground.

4. The switching mode power supply of claim 1, wherein the feedback circuit comprises a resistor-divided circuit or a capacitor-divided circuit.

5. The switching mode power supply of claim 1, wherein the spectrum shaping signal is a triangular wave signal.

6. The switching mode power supply of claim 5, wherein the spectrum shaping circuit comprises a comparator, a first switch, a second switch, a bias circuit, a first shaping resistor, a second shaping resistor, a third shaping resistor, a fourth shaping resistor, a fifth resistor, a shaping capacitor, and a second Zener diode, and wherein:

the shaping capacitor is coupled between an output of the spectrum shaping circuit and primary side ground;

the second shaping resistor and the second switch are coupled in series between the output of the spectrum shaping circuit and primary side ground;

a first terminal of the fifth resistor is coupled to the feedback circuit for receiving the feedback signal; a second terminal of the fifth resistor is coupled to an inverting input of the comparator via the bias circuit, and coupled to a primary side ground via the second Zener diode;

the first switch and the first shaping resistor are coupled in series between the second terminal of the fifth resistor and the output of the spectrum shaping circuit;

the third shaping resistor is coupled between the non-inverting input of the comparator and the output of the spectrum shaping circuit;

the fourth shaping resistor is coupled between the non-inverting input of the comparator and the output of the spectrum shaping circuit;

the first switch and the second switch are controlled by the output of the spectrum shaping circuit.

7. The switching mode power supply of claim 6, wherein the first switch and the second switch are turned on alternately.

8. The switching mode power supply of claim 1, wherein the control circuit further comprises:

a current sensing circuit coupled to the switching circuit, the current sensing circuit being configured to generate a current sensing signal;

a comparison circuit configured to generate a comparison signal in response to the current sensing signal and a reference signal;

a clock generator configured to generate a clock signal in response to the spectrum shaping signal; and a logical circuit configured to generate a logical signal which is used to control the switch in response to the comparison signal and the logical signal.

9. The switching mode power supply of claim 8, wherein the comparison circuit comprises a comparator.

10. The switching mode power supply of claim 8, wherein the logical circuit comprises a flip-flop that includes a set input terminal receiving the clock signal and a reset input terminal receiving the comparison signal.

11. The switching mode power supply of claim 8, wherein the clock generator comprises a saw-tooth wave generator.

12. The switching mode power supply of claim 11, wherein the clock generator further comprises a short pulse generator.

13. A method used in a switching mode power supply, comprising:

coupling a switching circuit to a primary winding of a transformer, the switching circuit configured to store energy in the primary winding when the switching circuit is turned on, and release energy from the primary winding to a secondary winding when the switching circuit is turned off;

sensing a current flow through the primary winding of the transformer and generating a current sensing signal accordingly;

sensing an output voltage and generating a feedback signal related to the output voltage;

toggling the switching circuit at a switching frequency in accordance with the current sensing signal and the feedback signal; and varying the switching frequency within a spectrum shaping range in response to the feedback signal.

14. The method of claim 13, further comprising comparing the current sensing signal with a reference signal, and turning off the switching circuit when the current sensing signal is higher than the reference signal.

15. The method of claim 13, further comprising:

generating a spectrum shaping signal in response to the feedback signal;

generating a clock signal in response to the spectrum shaping signal, so as to turn on the switch at an edge of the clock signal; and regulating the switching frequency by regulating a frequency of the clock signal.

16. The method of claim 13, wherein the switching frequency decreases and the spectrum shaping range becomes narrower when the feedback signal increases, and wherein the switching frequency increases and the spectrum shaping range becomes broader when the feedback signal decreases.

* * * * *